UNITED STATES PATENT OFFICE.

JACOB S. ROBESON, OF CAMDEN, NEW JERSEY, ASSIGNOR TO ROBESON PROCESS COMPANY, OF CAMDEN, NEW JERSEY, A CORPORATION OF NEW JERSEY.

COMPOSITION OF MATTER AND PROCESS OF MAKING SAME.

No. 851,380. Specification of Letters Patent. Patented April 23, 1907.

Application filed May 24, 1906. Serial No. 318,562.

*To all whom it may concern:*

Be it known that I, JACOB S. ROBESON, a citizen of the United States, and a resident of Camden, Camden county, New Jersey, have invented an Improved Composition of Matter and Process of Making the Same, of which the following is a specification.

My invention relates to compositions of matter having adhesive properties, and consists of an improved compound of this nature comprising a mass of sulfite liquor combined with molasses and a starchy material which may be in the form of dextrine in any of its forms, ordinary starch or flour.

My invention comprises further the method or process of making this improved composition of matter.

In the manufacture of cellulose or paper pulp under what is known as the "sulfite process", which consists in boiling wood and other fibres under pressure in a solution containing sulfurous acid and a base, such as lime or magnesia, a vast quantity of a watery mixture known as "waste sulfite liquor" is produced that hitherto has had little value, besides being highly objectionable in a number of ways and very difficult of disposal. In carrying the method or process of my present invention into effect, I employ a concentrated or evaporated solution of the same; preferring to use a neutral, undecomposed and concentrated mass of this waste liquor made in accordance with a method I have developed for utilizing such material. In my Patent, No. 833,634, dated October 16, 1906, I have set forth a process of treating this raw waste liquor, by rendering it substantially neutral with the aid of milk of lime or other suitable alkaline material, and then quickly concentrating such neutralized body *in vacuo*, without decomposition, to a desirable density.

In the preferred method or process of making my improved compound, I propose to use this substantially neutral, undecomposed and concentrated mass of sulfite liquor made in accordance with the process above set forth, and to a quantity of this liquor at a density of about 30° B., I add a certain quantity by volume of molasses, and a certain quantity by volume of a watery solution or paste of starchy material, which may be made from dextrine, flour or ordinary starch. The watery solutions or pastes of the starchy material, whether of dextrine, flour and starch are, approximately, in the proportion of about two and one-half (2 1/2) pounds of the dry form of such material to about four (4) quarts of water, and they are prepared by cooking or in any other desirable manner.

I have discovered that a combination of the ingredients herein set forth is highly valuable as an adhesive and that the starchy material may be in the form of flour of the various grades, dextrine or starch of the various grades, all of these materials working equally well. There is this difference, however, that the proportions of the various materials used will vary, depending upon the form of the starchy material used. For instance, when dextrine is combined with the sulfite liquor and molasses, I may use substantially equal parts by volume of said ingredients. The sulfite liquor is of a density of 30° B., the molasses is of the ordinary or common grade, the cheapest on the market, and the dextrine employed is from a solution or paste of the same in the proportions above set forth. When flour is used in place of the dextrine, however, the proportions, by volume, are substantially as follows: sulfite liquor, 30 parts, molasses, 30 parts, flour paste, 40 parts. When starch is used there is again a difference, and in this form of my improved composition of matter, the proportions, by volume, are substantially as follows: sulfite liquor, 40 parts, molasses, 35 parts, starch paste, 25 parts.

The various forms of this improved composition of matter have, apparently, the same valuable adhesive properties. If desired, the flour, dextrine or starch may be mixed with the raw sulfite liquor in preparing the pasty masses of the same for admixture with the other ingredients. The combined mixtures are preferably subjected to the action of heat to insure the intimate and complete admixture of the ingredients thereof, although satisfactory results can be secured by mixing the ingredients at ordinary temperatures.

I claim:

1. An adhesive comprising sulfite liquor, molasses, and a starchy material.

2. An adhesive, comprising concentrated sulfite liquor, molasses, and a starchy material in a fluent form.

3. An adhesive comprising sulfite liquor, molasses, and dextrine.

4. An adhesive, comprising concentrated sulfite liquor, molasses, and dextrine in a fluent form.

5. A composition of matter comprising sulfite liquor, molasses, and a starchy material, in equal proportions.

6. A composition of matter, comprising a neutral, concentrated and undecomposed mass of sulfite liquor, molasses, and a starchy material in a fluent form, in equal proportions.

7. The process herein described of making an adhesive, said process consisting in concentrating sulfite liquor, and then adding thereto certain quantities of molasses and a starchy material.

8. The process herein described of making an adhesive, said process consisting in concentrating sulfite liquor, preparing a paste of a starchy material, and then mixing said ingredients in certain proportions with molasses.

9. The process herein described of making an adhesive, said process consisting in concentrating sulfite liquor, preparing a paste of dextrine, and then mixing said ingredients in certain proportions with molasses.

10. The process herein described of making an adhesive, said process consisting in concentrating sulfite liquor, and then adding to a quantity thereof, equal quantities of molasses and a starchy material.

11. The process herein described of making an adhesive, said process consisting in concentrating sulfite liquor, and then adding to a quantity thereof, equal quantities of molasses and dextrine.

12. The process herein described of making an adhesive, said process consisting in concentrating sulfite liquor, adding thereto certain quantities of molasses and a starchy material, and then incorporating said mixture by the agency of heat.

13. The process herein described of making an adhesive, said process consisting in concentrating sulfite liquor, preparing a paste of a starchy material, mixing said ingredients in certain proportions with molasses, and then incorporating said mixture by the agency of heat.

14. The process herein described of making an adhesive, said process consisting in concentrating sulfite liquor, preparing a paste of dextrine, mixing said ingredients in the proper proportions with molasses, and then incorporating said mixture by the agency of heat.

15. The process herein described of making an adhesive, said process consisting in concentrating sulfite liquor, adding to a quantity thereof, equal quantities of molasses and a starchy material, and then incorporating said mixture by the agency of heat.

16. The process herein described of making an adhesive, said process consisting in concentrating sulfite liquor, adding to a quantity thereof, equal quantities of molasses and dextrine, and then incorporating said mixture by the agency of heat.

In testimony whereof, I have signed my name to this specification, in the presence of two subscribing witnesses.

JACOB S. ROBESON.

Witnesses:
 MURRAY C. BOYER,
 JOS. H. KLEIN.